(12) United States Patent
Tan et al.

(10) Patent No.: US 10,782,776 B2
(45) Date of Patent: Sep. 22, 2020

(54) VEHICLE DISPLAY CONFIGURATION SYSTEM AND METHOD

(71) Applicant: Nissan North America, Inc., Franklin, TN (US)

(72) Inventors: Adrian Tan, Northville, MI (US); Benjamin Hsiung, Troy, MI (US)

(73) Assignee: Nissan North America, Inc., Franklin, TN (US)

( * ) Notice: Subject to any disclaimer, the term of this patent is extended or adjusted under 35 U.S.C. 154(b) by 10 days.

(21) Appl. No.: 15/719,157

(22) Filed: Sep. 28, 2017

(65) Prior Publication Data

US 2019/0094959 A1    Mar. 28, 2019

(51) Int. Cl.
| | |
|---|---|
| *G06F 17/20* | (2006.01) |
| *G06F 3/01* | (2006.01) |
| *B60K 35/00* | (2006.01) |
| *B60K 37/02* | (2006.01) |
| *B60K 37/06* | (2006.01) |
| *G06F 3/16* | (2006.01) |
| *G06F 3/0484* | (2013.01) |

(52) U.S. Cl.
CPC .............. *G06F 3/013* (2013.01); *B60K 35/00* (2013.01); *B60K 37/02* (2013.01); *B60K 37/06* (2013.01); *B60K 2370/115* (2019.05); *B60K 2370/148* (2019.05); *B60K 2370/149* (2019.05); *B60K 2370/1438* (2019.05); *B60K 2370/151* (2019.05); *B60K 2370/155* (2019.05); *B60K 2370/52* (2019.05); *B60K 2370/73* (2019.05); *G06F 3/04842* (2013.01); *G06F 3/167* (2013.01); *G06F 2203/04803* (2013.01)

(58) Field of Classification Search
None
See application file for complete search history.

(56) References Cited

U.S. PATENT DOCUMENTS

| | | | |
|---|---|---|---|
| 7,881,493 B1 * | 2/2011 | Edwards | G06K 9/00597 348/78 |
| 7,889,063 B2 | 2/2011 | Rovik et al. | |
| 9,207,762 B2 * | 12/2015 | Tsou | G06F 3/005 |
| 9,580,081 B2 | 2/2017 | George-Svahn et al. | |
| 2012/0235806 A1 | 9/2012 | Watson et al. | |

(Continued)

FOREIGN PATENT DOCUMENTS

EP           1067682 A2 *  1/2001   ......... G01C 21/3629

*Primary Examiner* — Shahid K Khan
(74) *Attorney, Agent, or Firm* — Global IP Counselors, LLP

(57) ABSTRACT

A vehicle display configuration system and method employs a display, an eye tracker and a controller. The eye tracker is configured to track eye movement of a user viewing the display. The controller is configured to control the display to sequentially display sets of a plurality of images for comparison and selection by the user, to receive selection information representing a respective selected image from each of the sets being displayed on the display as selected by the user, to analyze eye tracker eye movement information received from the eye tracker representing eye movement of the user while the user is viewing each of the sets being displayed on the display, and to designate a vehicle display image based on the selection information and a result of the analysis of the eye movement information.

19 Claims, 16 Drawing Sheets

(56) References Cited

U.S. PATENT DOCUMENTS

| | | | | |
|---|---|---|---|---|
| 2012/0271484 | A1* | 10/2012 | Feit | B60W 30/12 |
| | | | | 701/1 |
| 2012/0290401 | A1* | 11/2012 | Neven | G06K 9/00671 |
| | | | | 705/14.68 |
| 2014/0004901 | A1* | 1/2014 | Korn | H04M 1/72522 |
| | | | | 455/556.1 |
| 2014/0055337 | A1* | 2/2014 | Karlsson | G06F 3/013 |
| | | | | 345/156 |
| 2014/0129987 | A1* | 5/2014 | Feit | G06F 3/04842 |
| | | | | 715/835 |
| 2014/0320397 | A1* | 10/2014 | Hennessey | A61B 3/113 |
| | | | | 345/156 |
| 2015/0049112 | A1* | 2/2015 | Liu | G06T 19/006 |
| | | | | 345/633 |
| 2015/0154445 | A1* | 6/2015 | Biswas | G06K 9/00604 |
| | | | | 345/2.3 |
| 2016/0225012 | A1* | 8/2016 | Ha | G06Q 30/0277 |
| 2017/0301145 | A1* | 10/2017 | Miller | G06T 19/006 |
| 2017/0322679 | A1* | 11/2017 | Gordon | G06F 3/013 |
| 2017/0336865 | A1* | 11/2017 | Meyer | G06F 3/013 |

* cited by examiner

VEHICLE DISPLAY CONFIGURATION SYSTEM AND METHOD

BACKGROUND

Field of the Invention

The present invention generally relates to a vehicle display configuration system and method. More specifically, the present invention relates to a system and method that configures a vehicle instrument panel screen display based on user selection of a display configuration and user eye tracking analysis during the user selection.

Background Information

In many vehicles today, the instrument panel of the vehicle includes a display which can display, for example, map and navigation information, radio channel selection information, vehicle setup information and so on. Such displays can be configured by the user, such as the driver, based on the user's preference. For example, the user may select the range of the map display, the display orientation with reference to North, whether traffic and locations of interest should be displayed, and so on. The user may also select radio channel presets that are displayed on the display, the brightness of the display, full display mode versus split-screen mode, and so on. Other examples can include selecting content for vehicle instrument cluster, selecting content for the vehicle head-up displays, adjusting the visibility, size and theme characteristics of displayed content.

SUMMARY

It has been discovered that it is desirable to assist the user with the display configuration. For example, although a user may find a particular display configuration aesthetically pleasing, the user may have difficulty in locating some of the important buttons or information on the display because of their locations on the display. Also, the size of the buttons and information may be too large or too small depending on, for example, the user's eyesight and experience interacting with such displays.

To address these issues, a disclosed embodiment provides a vehicle display configuration system and method employing a display, an eye tracker and an electronic controller. The eye tracker is configured to track eye movement of a user viewing the display. The controller is configured to control the display to sequentially display sets of a plurality of images for comparison and selection by the user, to receive selection information representing a respective selected image from each of the sets being displayed on the display as selected by the user, to analyze eye tracker eye movement information received from the eye tracker representing eye movement of the user while the user is viewing each of the sets being displayed on the display, and to designate a vehicle display image based on the selection information and a result of the analysis of the eye movement information.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
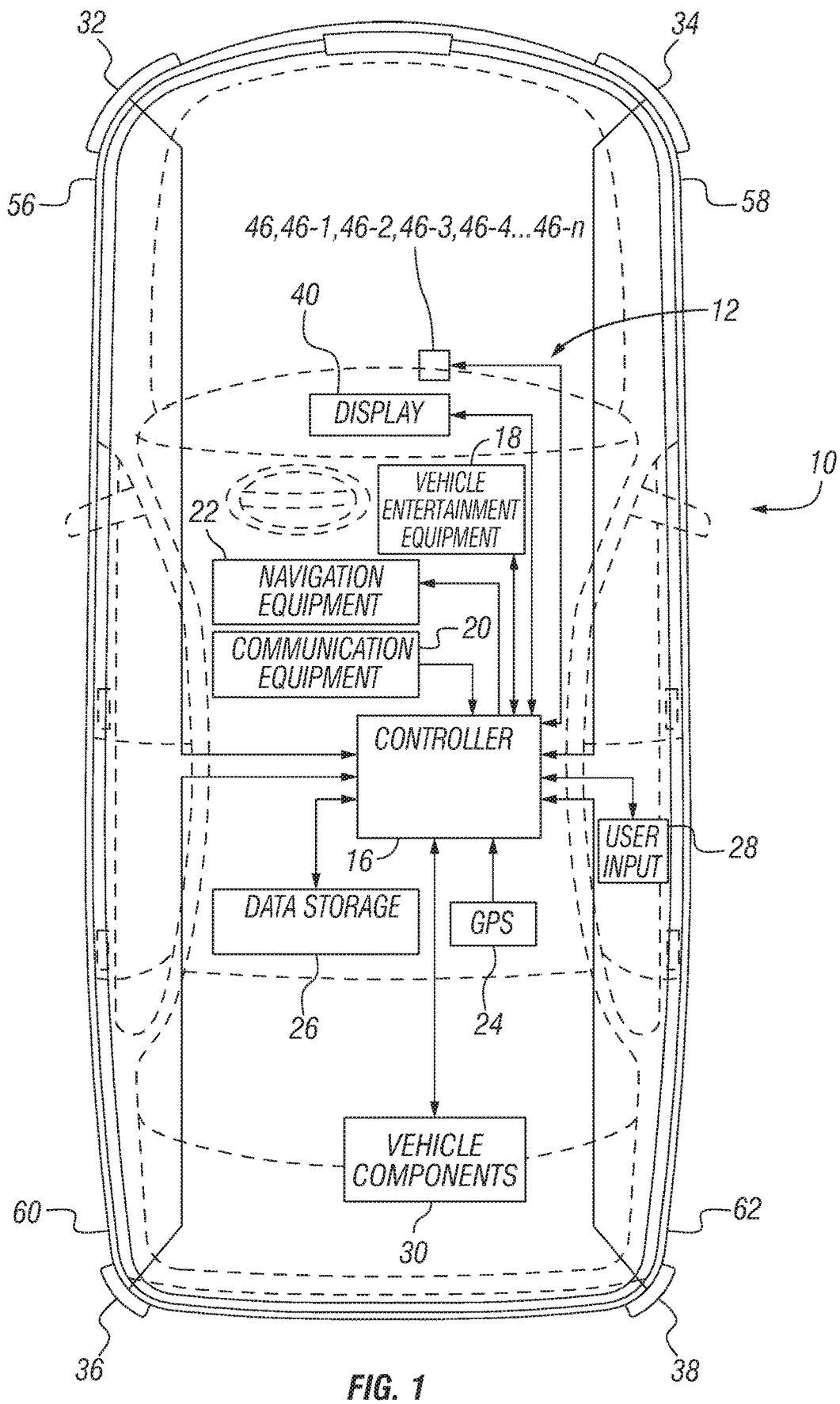
FIG. 1 is a schematic view of an example of components of a vehicle employing the vehicle display configuration system and method according to a disclosed embodiment.
Figure 2:
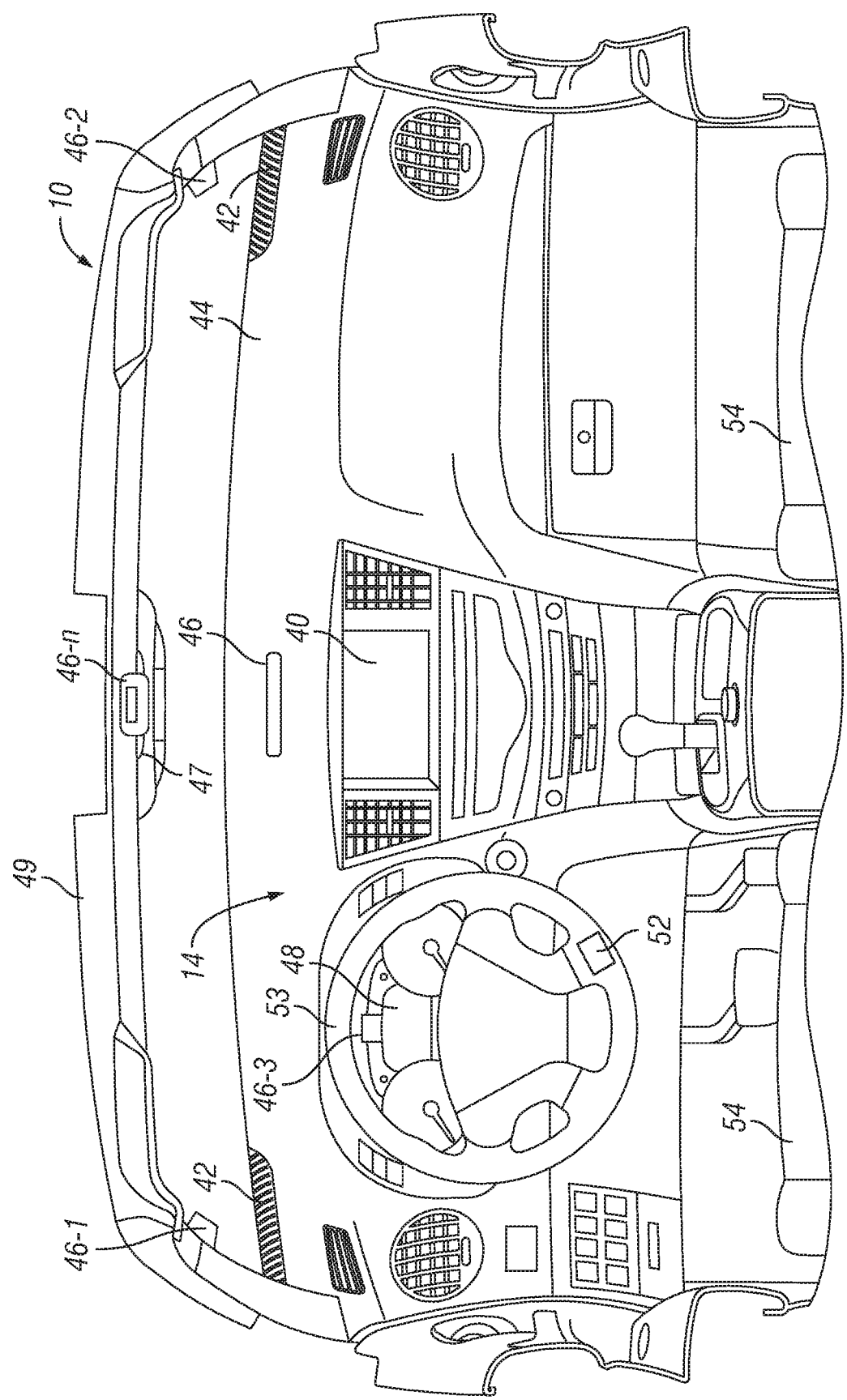
FIG. 2 is a schematic view of an example of the passenger compartment of the vehicle shown in FIG. 1.

FIG. 1 is a schematic view of an example of components of a vehicle 10 employing a vehicle display configuration system 12 according to a disclosed embodiment, and FIG. 2 is a schematic view of an example of the passenger compartment 14 of the vehicle 10 shown in FIG. 1. The vehicle 10 can be any type of vehicle, such as a conventional combustion engine vehicle, an electronic vehicle, a hybrid vehicle, an autonomous vehicle and so on as understood in the art. The vehicle 10 includes an electronic controller 16, vehicle entertainment system equipment 18, communication equipment 20, navigation equipment 22, GPS equipment 24, a data storage 26, user inputs 28, vehicle components 30, front vehicle sensors 32 and 34, rear vehicle sensors 36 and 38, and any other types of equipment typically present in a vehicle 10 as understood in the art.

The controller 16 includes a processor, such as a microcomputer, with a control program that controls the vehicle 10 as discussed herein. The processor can be part of a microcomputer. The controller 16 can also include other conventional components such as an input interface circuit, an output interface circuit, and storage devices, such as a ROM (Read Only Memory) device and a RAM (Random Access Memory) device. The internal RAM of the controller 16 can store statuses of operational flags, various control data and so on, and the internal ROM of the controller 16 can store the control program and any information for the various operations described herein as understood in the art.

The controller 16 is operatively coupled to the vehicle entertainment system equipment 18, communication equipment 20, navigation equipment 22, GPS equipment 24, data storage 26, user inputs 28, vehicle components 30, front vehicle sensors 32 and 34, rear vehicle sensors 36 and 38 and the other types of equipment on the vehicle 10 in any suitable manner as understood in the art, and is programmed to monitor and control these components as discussed herein. The data storage 26 can also store processing results and control programs that are run by the controller 16, such as processing results and control programs for the vehicle entertainment system equipment 18, communication equipment 20, navigation equipment 22, GPS equipment 24, data storage 26, user inputs 28, vehicle components 30, front vehicle sensors 32 and 34, rear vehicle sensors 36 and 38, and any other suitable information. The data storage 26 can also store information received from another vehicle (not shown), and from any other entity as discussed herein or as would be understood by one skilled in the art.

The vehicle entertainment system equipment 18 can include a plurality of displays, speakers, tactile devices and so on that can provide audiovisual information, messages and so on for receipt by occupants of the vehicle 10. For example, the vehicle entertainment system equipment 18 can include or be operative with a display 40 and speakers 42 present on the instrument panel 44 in the passenger compartment 14 of the vehicle 10 as shown in FIG. 2, to provide visual and audio information to occupants of the autonomous vehicle 12 as discussed below. The display 40 can be any suitable type of display such as an LCD screen, a touch panel, a flat screen display, a heads-up display, a window display, and so on as understood in the art. It should also be noted that when the vehicle 10 is an autonomous vehicle, the driver may not be looking at a display on the instrument panel 44, but could be looking at a display somewhere else within the passenger compartment 14. An eye tracking device 46 that is operable to track eye movement of an occupant, such as a driver, is disposed at or proximate to the display 40, proximate to the meter cluster display 48, or at any other suitable location, as understood in the art. As understood in the art, the eye tracking device 46 can also measure eye characteristics such as pupil diameter and so on. The eye tracking device 46 provides eye tracking data to the controller 16 for purposes discussed herein. The eye tracking data can include, for example, data pertaining to scanning patterns and saccades, number of fixations, fixation duration of each fixation, and any other information common in the eye tracking technology. Furthermore, more than one eye tracking device 46 can be disposed in the vehicle 10. For example, additional eye tracking devices 46-1, 46-2, 46-3, 46-4 through 46-n can be disposed in the passenger compartment 14. The controller 16 can control any or all of these eye tracking devices 46 through 46-n to perform eye tracking simultaneously, sequentially or in any suitable manner to achieve the eye tracking features for the purposes described herein, or for any other suitable purposes as would be understood by one skilled in the art. For instance, the controller 16 can use the eye tracking data provided by any or all of the eye tracking devices 46 through 46-n to measure visual acuity of the vehicle occupant.

Figure 4:
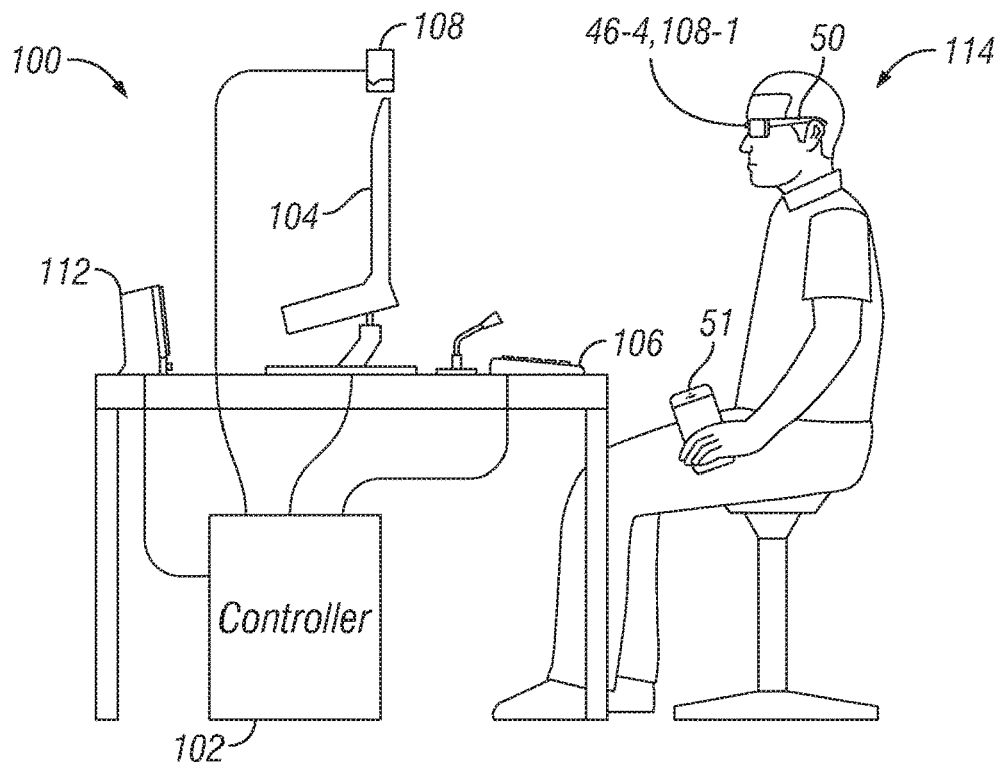
FIG. 4 is another schematic view of the test station shown in FIG. 3 illustrating an example of a location of user being tested in relation to the display.

One or more eye tracking devices 46 through 46-n can include, for example, a scene camera as understood in the art. Such an eye tracking device, for example, eye tracking device 46-n shown in FIG. 2, including the scene camera can be mounted at or near the dome light 47 in the passenger compartment 14, or at any other suitable location, to capture images of the instrument panel 44 and windshield 49 of the vehicle 10. Also, information gathered by the scene cameras, for example, can be used for occupant customizable features such as seating position, haptic feedback patterns and force presented through the steering wheel, seats, pedals and so on. In addition, any of the eye tracking devices 46 through 46-n can employ scene cameras and head-tracking features as understood in the art, or can be configured as a head-mounted system, such as a combination of an eye tracking device 46-4 and eyeglass 50 as shown in FIG. 4, or any other suitable type of arrangement for performing eye tracking operations as understood in the art. In addition, any of the eye tracking devices 46 through 46-n described above, including those having scene camera features, can be configured in a portable device 51 such as a smart phone, a tablet or any other type of device that is portable and removable from the vehicle 10. Also, the eye tracking operations, with or without the use of a scene camera, could be used to determine the head position of the occupant, and the position and angles of the displays such as display 40 and meter cluster display 48 can be adjusted accordingly by, for example, the controller 16. Furthermore, prior to performing the eye tracking operations as described herein, the controller 16 can operate the eye tracking devices 46 through 46-n to perform calibration operations with regard to the eye movement of the occupant if, for example, more accurate eye tracking is desirable.

In addition, one or more tactile device 52 can be disposed at suitable locations within the passenger compartment 14, such as at the steering wheel 53, at the seats 54 and so on as understood in the art. The tactile devices 50 are in communication with the controller 16 and thus controlled by the controller 16 as discussed herein. The vehicle entertainment system equipment 18 can further operate with the communication equipment 20 to send information, such as text messages, for receipt by devices, such as smartphones, notebooks, tablets and so on used by the occupants of the vehicle 10 or by people outside of the vehicle 10, or to other vehicles, as understood in the art.

The communication equipment 20 includes, for example, a receiver and a transmitter configured as individual components or as a transceiver, and any other type of equipment for wireless communication. For example, the communication equipment 20 is configured to communicate wirelessly over one or more communication paths. Examples of communication paths include a cellular telephone network, a wireless network (WiFi or a WiMAX), a DSRC (Dedicated Short-Range Communications) network, a power line communication network, etc. The communication equipment 20 is configured to receive information from external sources and to transmit such information to the controller 16. For example, the communication equipment 20 can communicate with another vehicle, or any other suitable entity via a communication network (not shown), direct communication, or in any suitable manner as understood in the art. Also, the communication equipment 20 can include or interact with, for example, microphones, speakers, displays and any other types of equipment to effect the types of interaction modalities such as audio interaction, audio and visual interaction, menu interface interaction, virtual personal assistant interaction and so on.

Furthermore, the communication equipment 20 can, for example, wirelessly receive information about events scheduled in a given local area from a subscribed local knowledge source via a service provider. For instance, the communication equipment 20 can be configured to receive information from mobile applications, such as social media applications, that are connected to the vehicle 10 and to transmit such information to the controller 16. For example, the communication equipment 20 can be configured to wirelessly receive information about Facebook and/or Twitter check-ins for various locations in a given area when a mobile phone with the Facebook and/or Twitter applications is connected to the vehicle 10.

The navigation equipment 22 is configured to communicate information with the controller 16, such as information about possible driving routes for the vehicle 10 as understood in the art. A driving route can be determined based on information received by the controller 16 from, for example, a mobile application connected to the vehicle 10, or based on a driving mode of the vehicle 10 as determined using any methods, devices or systems described herein or known in the art. The navigation equipment 22 can also be in communication with the GPS equipment 24 to determine, for example, a suggested driving route based on the location of the vehicle 10 and the location of a desired destination. The navigation equipment 22 can also be configured to display the suggested driving route to a driver inside the vehicle 10 on, for example, display 40 or in any other suitable manner.

The data storage 26 can be any suitable type of memory or storage device to which data can be stored and from which data can be retrieved. The user inputs 28 can be, for example, a touch panel on the display 40 or another display or panel, gesture sensing equipment, mechanical or virtual buttons on the steering wheel or at any other suitable locations inside or outside the vehicle 10 as discussed herein, and so on. The user inputs 28 can also be a separate device, such as a smart phone, tablet computer, notebook computer or any other suitable type of device that can communicate with the controller 16 via, for example, the communication equipment 20 or in any other suitable manner. The user inputs can provide a wide variety of control and functionality, including but not limited to enabling confirmation and/or change by the user.

The vehicle components 30 can include, for example, electrical and mechanical systems in the vehicle 10, such as the turn signals, windshield wipers, lights, door latches, trunk latches, tailgate latches, any system or device necessary or desired for vehicle operation (autonomous or otherwise), such as the brakes and the steering control system, and any other suitable systems as understood in the art. The vehicle components 30 can also include, for example, an externally-located audiovisual link having at least one microphone, speaker, camera, RFID reader and video screen, which could also operate as a touch panel. The vehicle components 30 can include at least one PIN pad, fingerprint reader, biometric ID equipment, and facial recognition equipment that can be present at one or more locations inside or outside the vehicle 10 as understood in the art.

As understood in the art, the vehicle sensors 32, 34, 36 and 38 are configured to monitor and sense the environment surrounding the vehicle 10, and to detect objects in proximity to the vehicle 10. As illustrated in FIG. 1, the vehicle sensors 32, 34, 36 and 38 can be mounted externally on front quarter panels 56 and 58, and on rear quarter panels 60 and 62 of the vehicle 10. However, the vehicle sensors 32, 34, 36 and 38 can be mounted on any suitable external portion of the vehicle 10, including the front and rear bumpers, the external mirrors or any combination of suitable areas. The vehicle sensors 32, 34, 36 and 38 communicate with the controller 16, which is then capable of using the information provided by the vehicle sensors 32, 34, 36 and 38 to control the autonomous vehicle 12 and to perform the operations discussed herein.

The vehicle sensors 32, 34, 36 and 38 can be any type of sensors desirable. For example, the front vehicle sensors 32 and 34 can include a long-range radar device for object detection in front of the vehicle 10. The front vehicle sensors 32 and 34 can be configured to detect objects at a predetermined distance (e.g., distances up to 200 m or further as desired), and can have any practical field of view angle (e.g., around 15°) as understood in the art. The front vehicle sensors 32 and 34 can also include short-range radar devices, typically having a larger field of view angle, to assist in monitoring the region in front of the vehicle 10. The rear vehicle sensors 36 and 38 can also include short-range radar devices and, if desired, long-range radar devices. In addition, the vehicle sensors vehicle sensors 32, 34, 36 and 38 can include cameras, radar sensors, photo sensors or any combination and number of these devices as understood in the art. Although the vehicle sensors 32, 34, 36 and 38 commonly include electronic detection devices that transmit electromagnetic waves (e.g., radar), the vehicle sensors 32, 34, 36 and 38 can include any suitable sensors that, for example, take computer-processed images with a digital camera and analyze the images or emit lasers, as is known in the art.

In addition, the vehicle sensors 32, 34, 36 and 38 can be configured to detect at least the speed, direction, yaw, acceleration and distance of the vehicle 10. Further, the vehicle sensors 32, 34, 36 and 38 can include other types of object-locating sensing devices including range sensors, such as FM-CW (Frequency Modulated Continuous Wave) radars, pulse and FSK (Frequency Shift Keying) radars, sonar and LIDAR (Light Detection and Ranging) devices, RFID (Radio-Frequency Identification) sensors, and ultrasonic devices which rely upon effects such as Doppler-effect measurements to locate forward objects. Object-locating devices can include charged-coupled devices (CCD) or complementary metal oxide semi-conductor (CMOS) video image sensors, and other known camera/video image processors which utilize digital photographic methods to "view" forward objects including one or more remote vehicles.

The vehicle sensors 32, 34, 36 and 38 can also monitoring oncoming traffic in front of, beside and behind the vehicle 10. The controller 16 can also use the vehicle sensors 32, 34, 36 and 38 to monitor traffic flow for maintaining lane position or performing lane departure maneuvers for the vehicle 10. The controller 16 can further determine whether the remote objects detected by the vehicle sensors 32, 34, 36 and 38 are pedestrians or remote vehicles, and the controller 16 can also determine the amount of vehicle traffic and the amount of pedestrian traffic based on the information received from the vehicle sensors 32, 34, 36 and 38.

Figure 3:
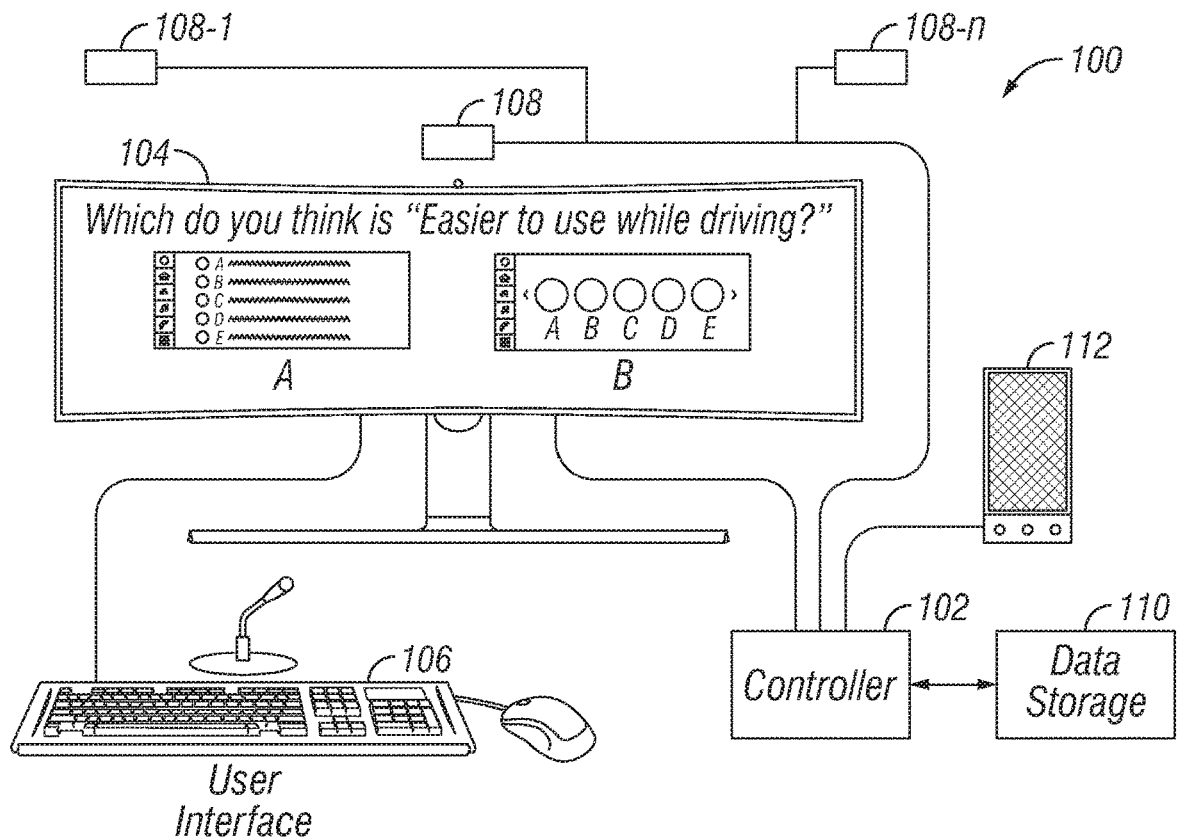
FIG. 3 is a schematic view of an example of a test station employing the vehicle display configuration system and method according to a disclosed embodiment.
Figure 5:
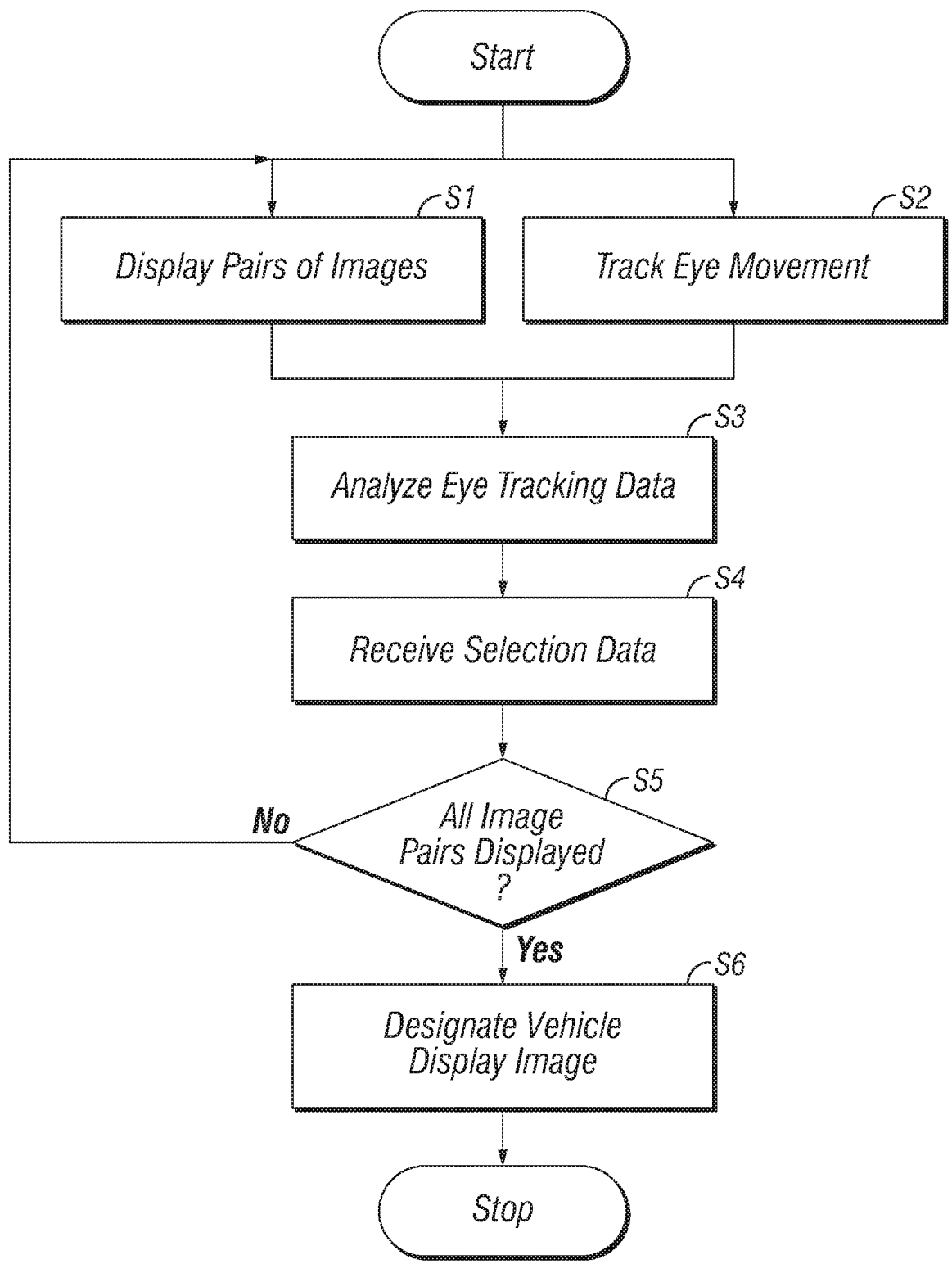
FIG. 5 is a flowchart illustrating an example of operations performed by the vehicle display configuration system to designate a display screen configuration that is preferred by a user.

Features of an embodiment of the vehicle display configuration system 12 will now be discussed. The vehicle display configuration system 12 enables a user to customize the display screen to be displayed, for example, on the display 40 of the vehicle 10. For purposes of this example, vehicle display configuration system 12 will be described in relation to a test station 100 as shown in FIGS. 3 and 4, a flowchart of exemplary operations as shown in FIG. 5, and a conceptual diagram of results as shown in FIG. 6. However, these features and operation of the vehicle display configuration system 12 can be incorporated into the vehicle 10 using the controller 16, the eye tracking device 46, the display 40, the meter cluster display 48, or a combination of the display 40 and the meter cluster display 48, along with any of the other components as discussed above with regard to FIGS. 1 and 2.

As shown in FIGS. 3 and 4, the test station 100 in this example includes a controller 102, a display 104, a user interface 106, at least one eye tracking device 108, a data storage 110 and an audio device 112. The test station 100 operates to assist a user 114 in selecting an optimum display configuration to be displayed on the display 40 of the vehicle 10. The controller 102, display 104 and user interface 106 can be configured as a typical computer work station as understood in the art. The controller 102 includes a processor, such as a microcomputer, with a control program that controls the display 104 as discussed herein. The processor can be part of a microcomputer. The controller 102 can also include other conventional components such as an input interface circuit, an output interface circuit, and storage devices, such as a ROM (Read Only Memory) device and a RAM (Random Access Memory) device. The internal RAM of the controller 102 can store statuses of operational flags, various control data and so on, and the internal ROM of the controller 102 can store the control program and any information for the various operations described herein as understood in the art. The controller 102 is operatively coupled to the display 104, the user interface 106 and the eye tracking device 108.

The display 104 can be any suitable type of display such as a flat screen display as shown, as well as an LCD screen, a touch panel and so on as understood in the art. The display 104 can be in a laboratory setting as shown, or can be positioned in front of an immobile vehicle 10 with the user 114 positioned in the passenger compartment 14 of the vehicle 14. The user interface 106 can be any suitable type of interface, such as a mouse and keyboard of a computer work station, a microphone, and any other type of device that is capable of sending instructions by the user 114 to the controller 102 in any conventional manner. The eye tracking device 108 can have any of the features discussed above with regard to eye tracking devices 46 through 46-n, and is operable to track eye movement of the user 114 being tested while the user is viewing the images being displayed on the display 104, and is disposed at or proximate to the display 104, or at any other suitable location as understood in the art. As understood in the art, the eye tracking device 108 can also measure eye characteristics such as pupil diameter and so on. The eye tracking device 108 provides eye tracking data to the controller 102 for purposes discussed herein. The eye tracking data can include, for example, data pertaining to scanning patterns and saccades, number of fixations, fixation duration of each fixation, and any other information common in the eye tracking technology. As with eye tracking devices 46 through 46-n, additional tracking devices 108-1 through 108-n can be disposed at any suitable location with respect to the user 114. The controller 102 can control any or all of these eye tracking devices 108 through 108-n to perform eye tracking simultaneously, sequentially or in any suitable manner to achieve the eye tracking features for the purposes described herein, or for any other suitable purposes as would be understood by one skilled in the art.

For instance, as with eye tracking devices 46 through 46-n discussed above, the controller 102 can use the eye tracking data provided by any or all of the eye tracking devices 108 through 108-n to measure visual acuity of the user 114.

Also, any of the eye tracking devices 108 through 108-n can employ scene cameras and head-tracking features as understood in the art, or can be configured as a head-mounted system, such as a combination of an eye tracking device 108-1 and eyeglass 50 as shown in FIG. 4, or any other suitable type of arrangement for performing eye tracking operations as understood in the art. Also, the eye tracking operations, with or without the use of a scene camera, could be used to determine the head position of the user 114, and in consideration of this information, the position and angles of the displays such as display 40 and meter cluster display 48 in the vehicle 10 can be adjusted accordingly. In addition, any of the eye tracking devices 108 through 108-n described above, including those having scene camera features, can be configured in a portable device 51 such as a smart phone, a tablet or any other type of device that is portable. Furthermore, prior to performing the eye tracking operations as described herein, the controller 102 can operate the eye tracking devices 108 through 108-n to perform calibration operations with regard to the eye movement of the occupant if, for example, more accurate eye tracking is desirable.

The data storage 110 can be any suitable type of memory or storage device to which data can be stored and from which data can be retrieved. For example, the data storage 110 can store different examples of display screen configurations that the controller 102 can control the display 104 to display for selection by the user being tested. The data storage 110 can also store the results of the testing, and those results can be used to configure the user-preferred display screen to be displayed, for example, on the display 40 of the vehicle 10. The audio device 112 can be, for example, a speaker or any other suitable type of device that can be controlled by the controller 102 to emit a sound for perception by the user 114.

As further shown in FIG. 3, with reference to the flowchart in FIG. 5, the controller 102 in Step S1 controls the display 104 to sequentially display sets of a plurality of display images (e.g., display images "A," "B," "C," "D" and so on), for comparison and selection by the user. For example, the controller 102 can retrieve data pertaining to each of the display images from the data storage 110, and control the display 104 to present a side-by-side comparison of two images for selection by the user 114. The controller 102 can determine which pairs of images to present initially, and the order in which the pairs of images is presented, based on factors such as counterbalancing to reduce experimental confounds of ordering effects such as learning and fatigue. In the example shown in FIG. 3, the controller 102 in Step S1 is controlling the display 104 to display pairs of images A and B side by side for selection by the user 114. However, the controller 102 could control the display 104 to initially display images C and D, A and C, A and D or any pair of the images. The images A and B could include information and buttons for selection as indicated, or simply information presented in different organizations in images A and B. Also, the images A and B need not be presented side by side, but can be presented sequentially, and can be sequentially repeated as image A and image B until an image is selected. While the user 114 is viewing the images A and B, the controller 102 in Step S2 is controlling the eye tracking device 108 to track the respective eye movements of the user 114 as related to each of the respective images A and B. Steps S1-S5 can be considered a first test. If these steps were repeated a second time, the second iteration of steps S1-S5 is a second test.

Figure 6A:
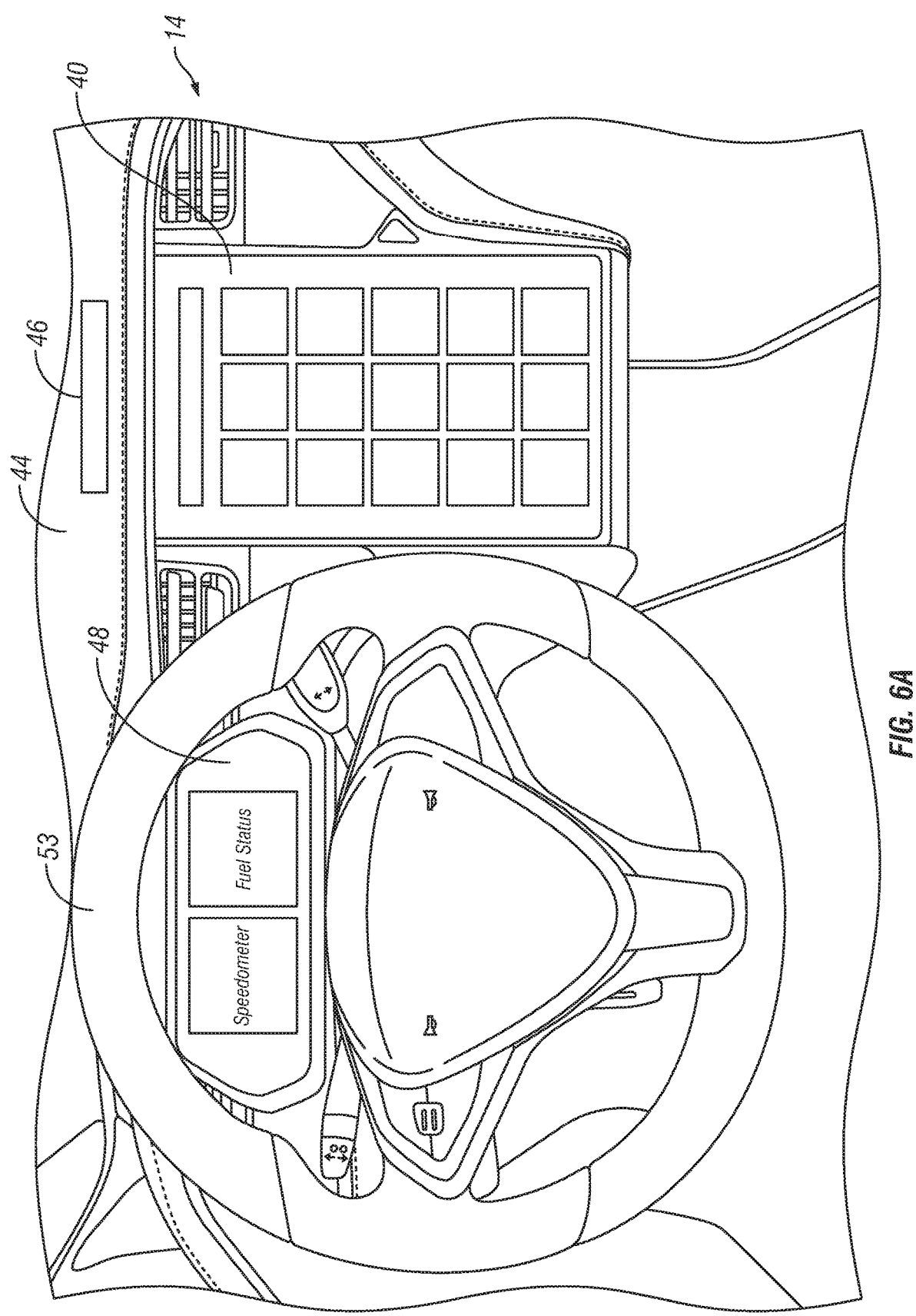
FIGS. 6A and 6B show a schematic view of an example of the passenger compartment of the vehicle with the display illustrating an A to B comparison.
Figure 6B:
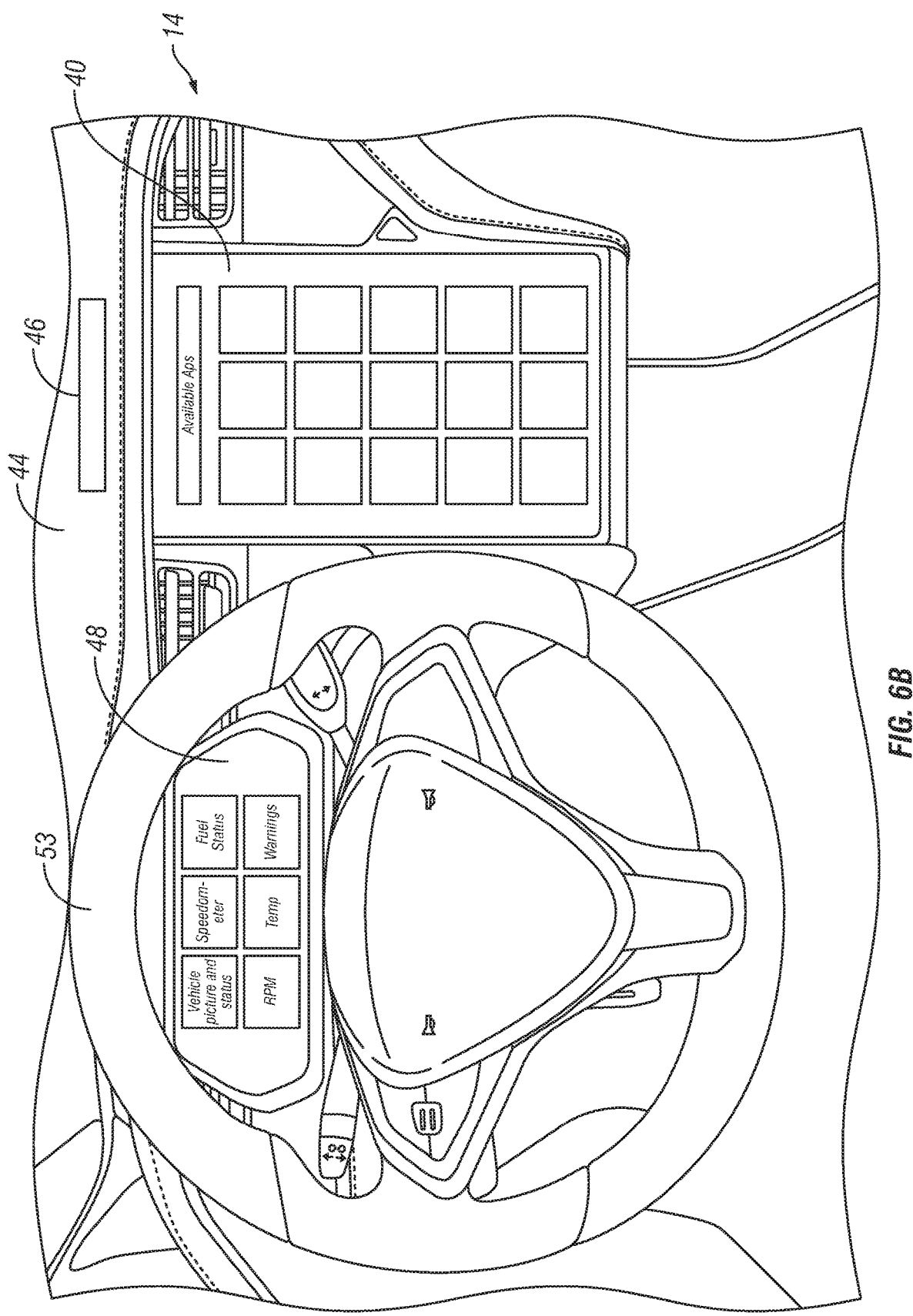
Figure 6C:
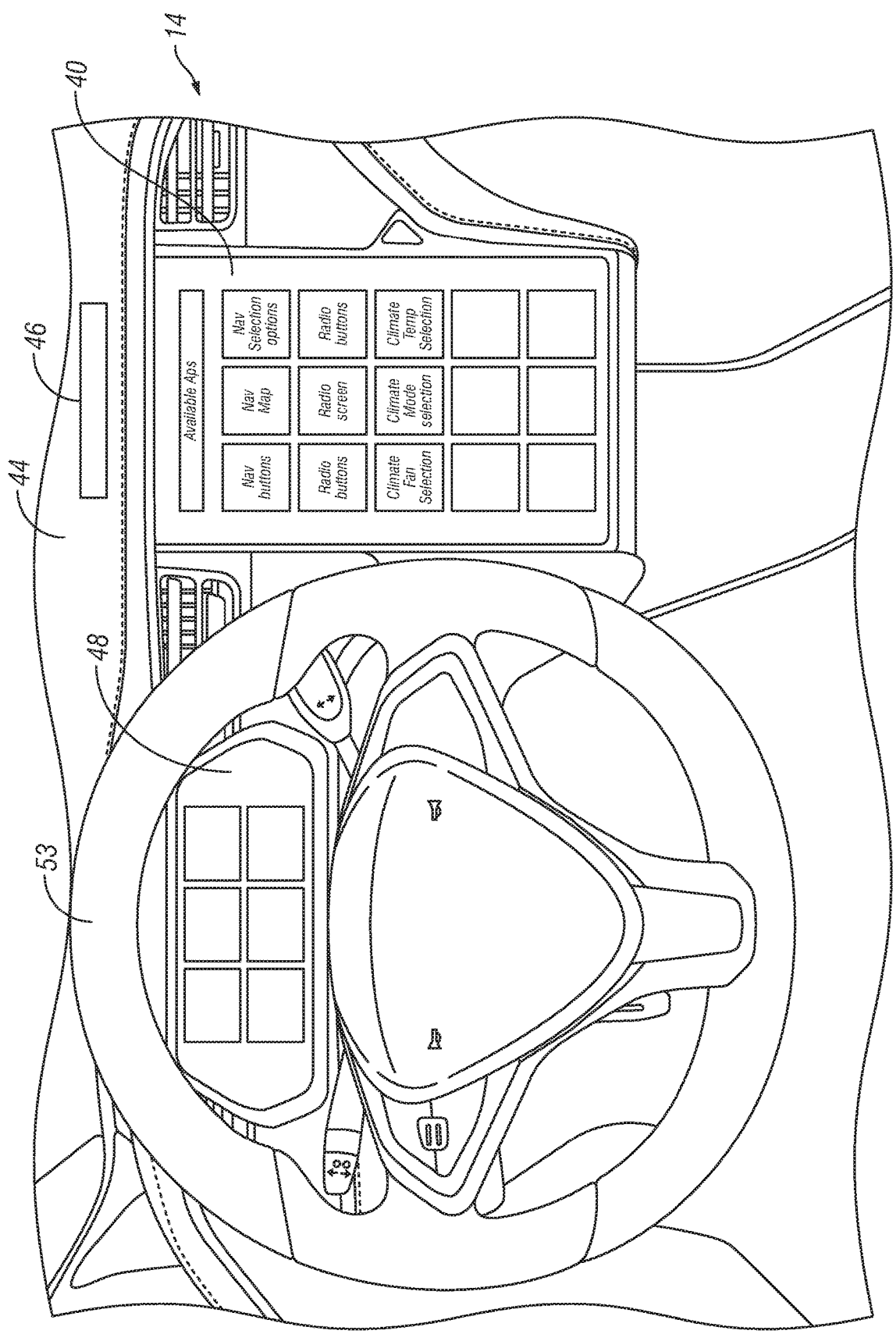
FIG. 6C through FIG. 6F show a schematic view of an example of the passenger compartment of the vehicle with the display illustrating several varying arrangements and complexity.
Figure 6D:
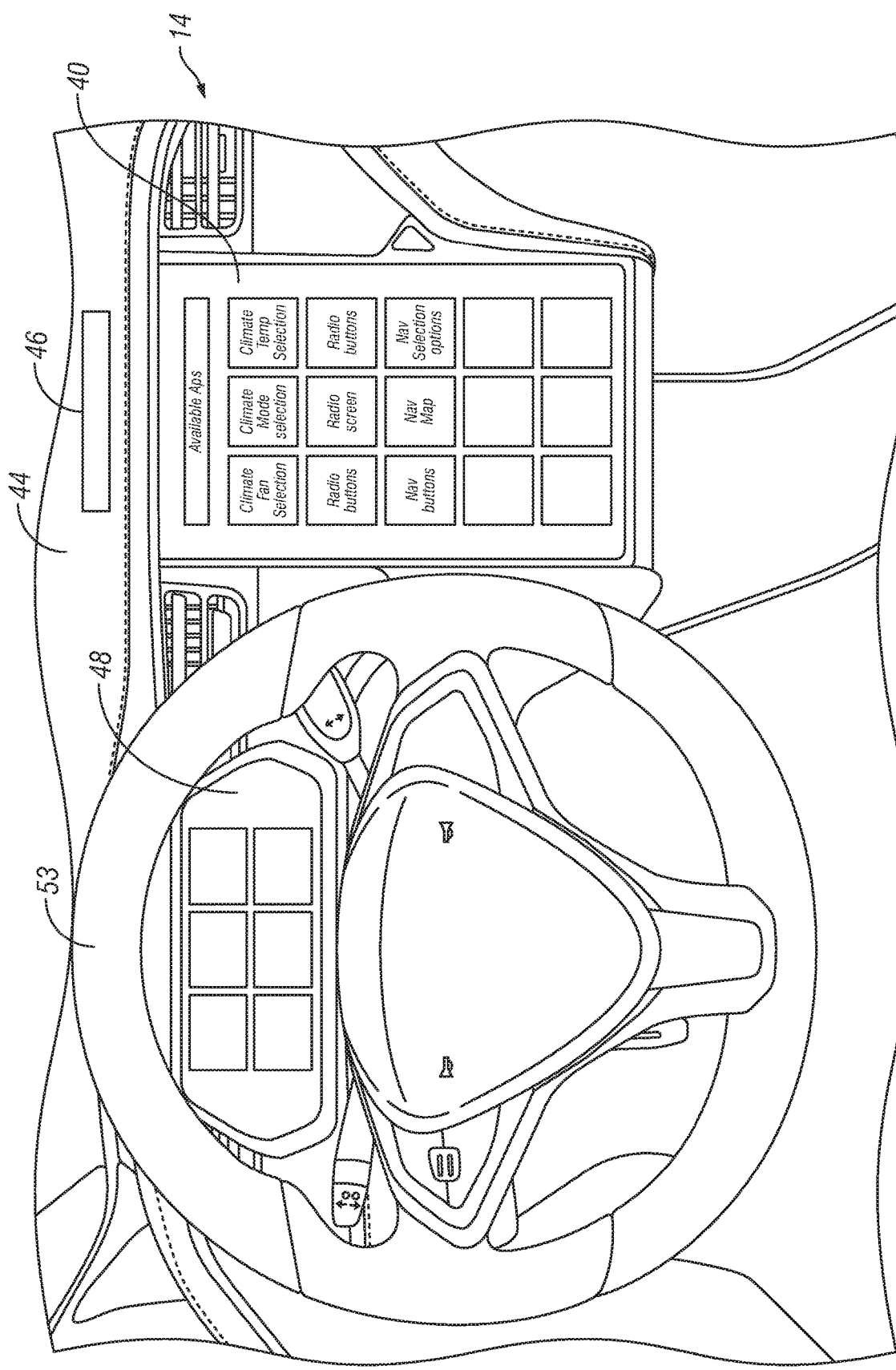
Figure 6E:
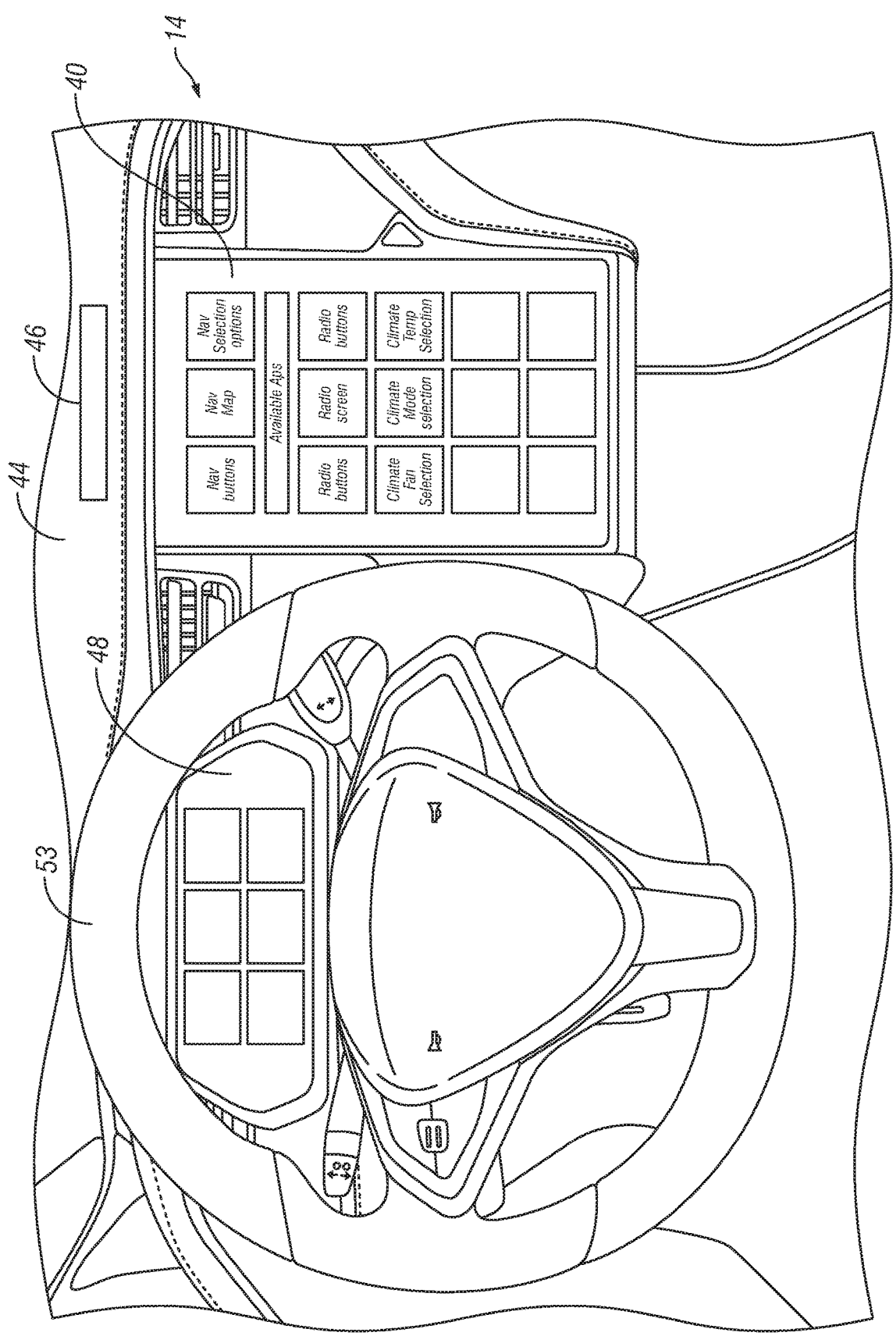
Figure 6F:
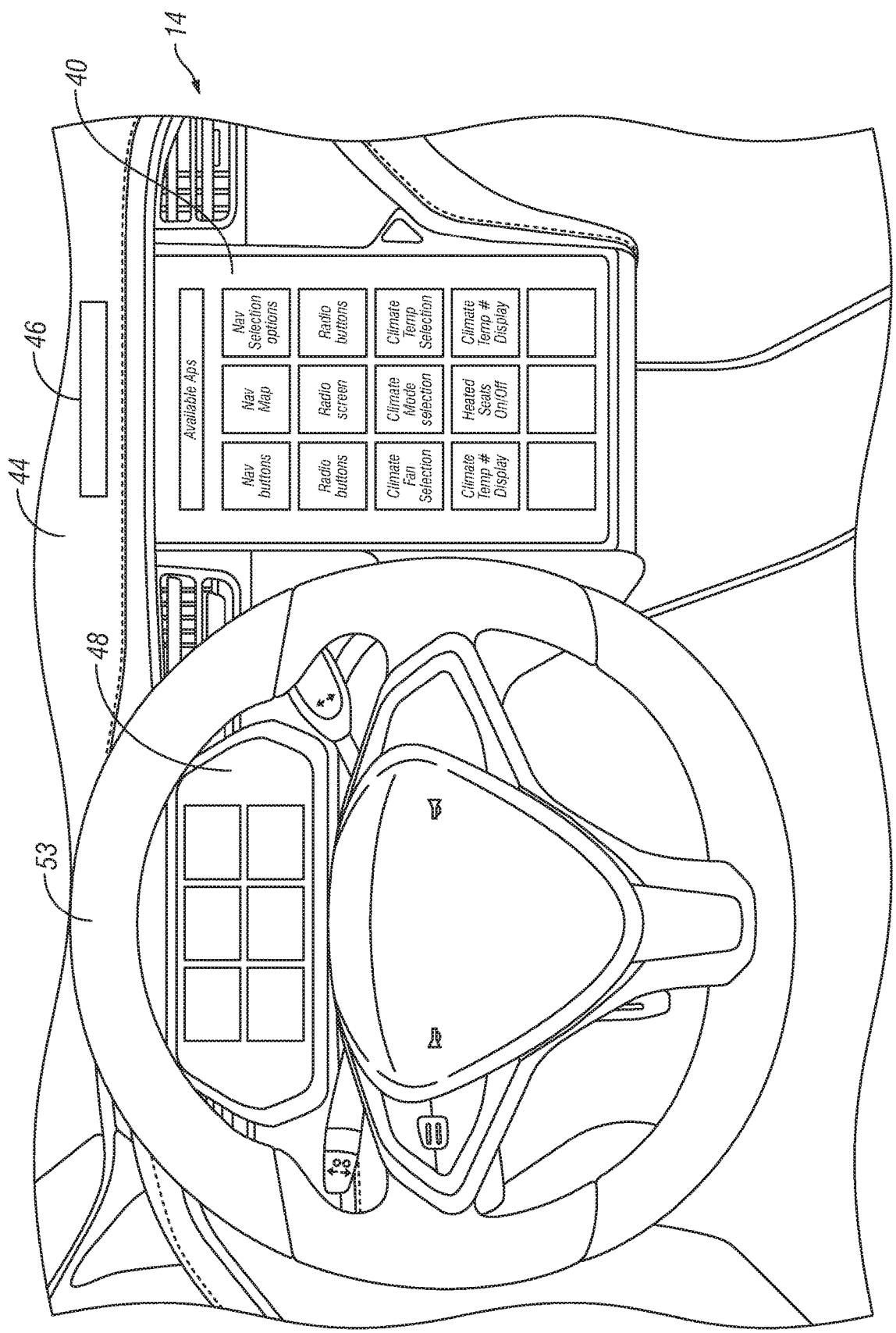

FIG. 6A and FIG. 6B show one A to B comparison. FIG. 6A shows a less complex display than FIG. 6B. In one embodiment, the user is shown both displays side by side. If the user chooses FIG. 6A in the A to B comparison and eye tracking data shows that the user was less confused by FIG. 6A, the controller 16 will recommend the display in FIG. 6A for both tests.

FIG. 6C through FIG. 6F illustrates several displays with varying arrangements and complexity. The user could be shown A to B comparisons for each of these displays and eye tracking data can be recorded during the comparisons. Based on the A to B comparisons, the user may have statistically selected one display. Based on the eye tracking data, the user may have one display layout that is easiest to understand. The controller can then present the two best display to the user and let the user select the final display.

Figure 6G:
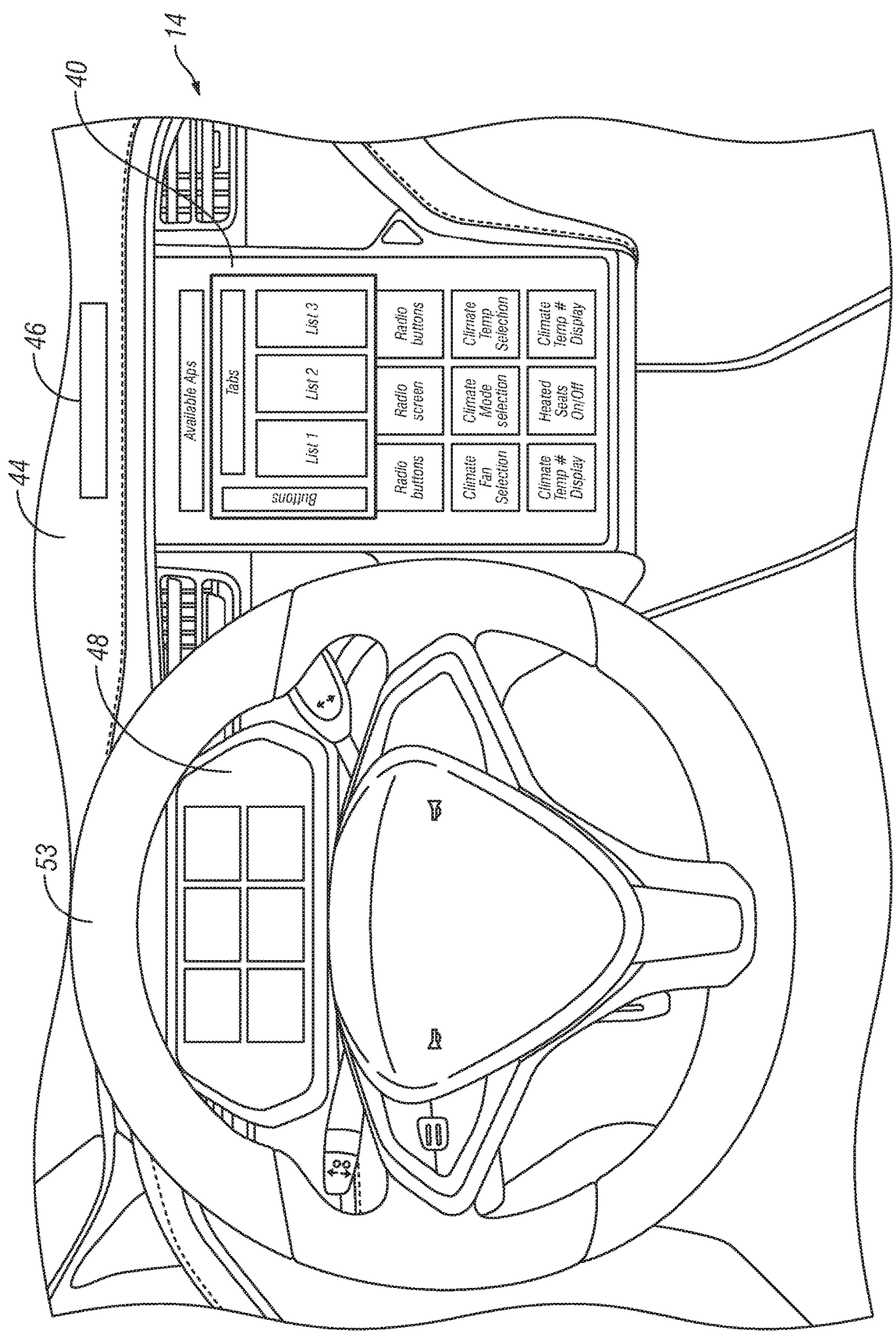
FIG. 6G through 6H show a schematic view of an example of the passenger compartment of the vehicle with the display illustrating two variations for the navigation display layout.
Figure 6H:
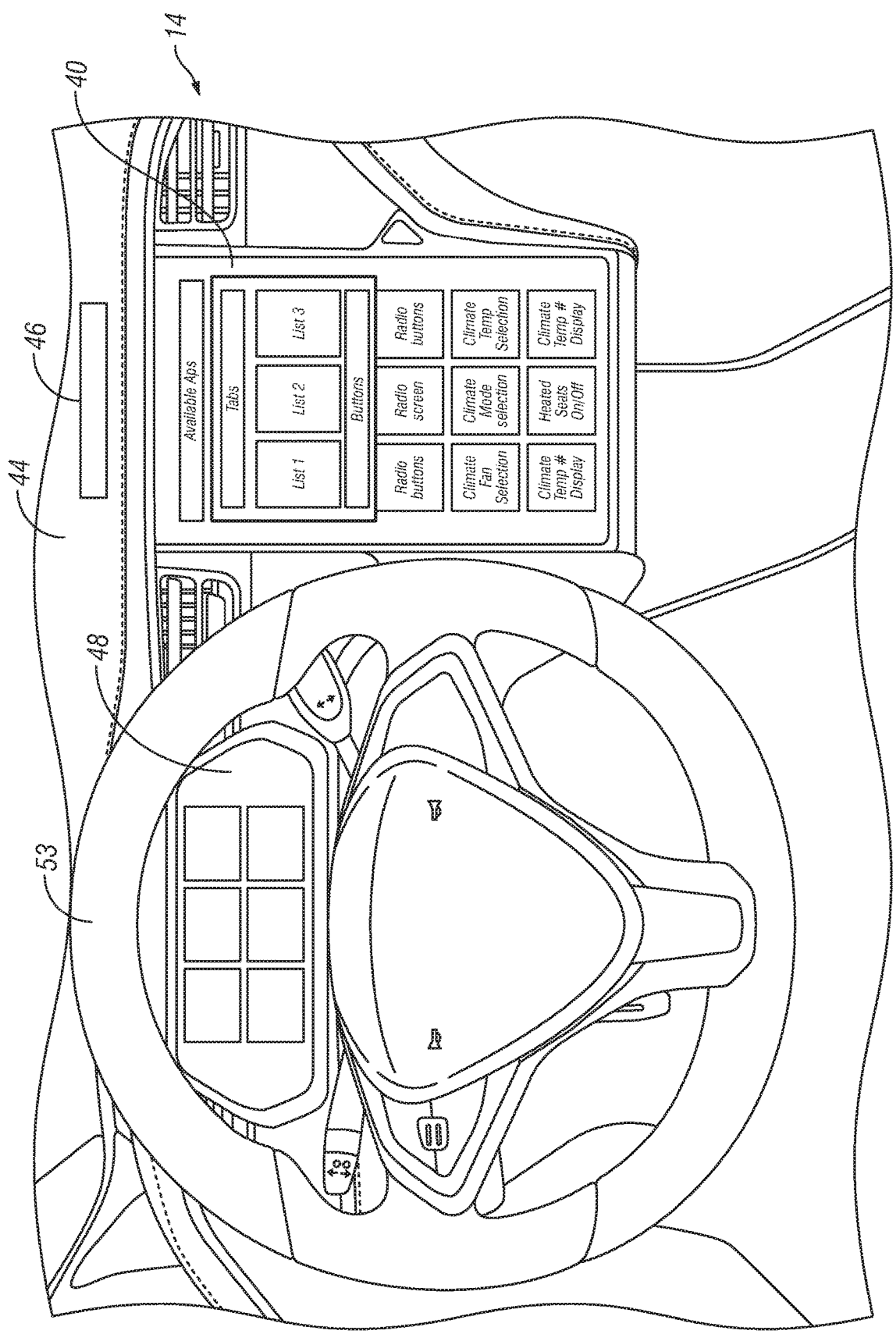

FIGS. 6G and 6H illustrate show two variations for the navigation display layout. The A to B comparisons and eye tracing could be used to recommend one of these displays. In additions, the test may be triggered when the controller recognizes that the user is confused by the display set in the factory.

Figure 7:
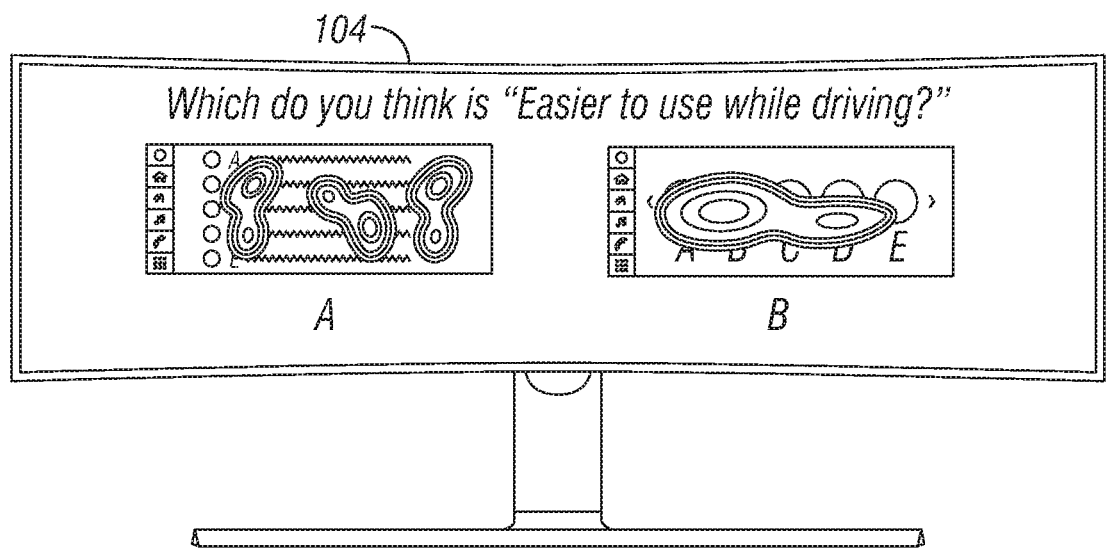
FIG. 7 is a conceptual diagram illustrating the results of eye tracking that is performed while the user is viewing a pair of images being displayed as shown in FIG. 3.

An example of eye tracking patterns that can be tracked by the eye tracking device 108 for each of the pairs of images is shown in FIG. 7. In particular, FIG. 7 illustrates tracking analysis after the tracking the eyes using a visual technique called "Heat Mapping". Heat maps can represent the scan paths. In post analysis, as understood by one of skill in the art, the size of the scan path dots for each focus point further indicate the "fixation time" at each point.

This eye tracking data can thus provide a quantitative visualization of layout performance. The controller 102 can further control the display 104 to display, for example, a dot or icon representing the eye movement on the display 104 as the user 114 is viewing the images A and B. This allows a user 114 to, for example, vocalize their perception of the images A and B, and this spoken information can be received by the controller 102 via the user interface 106, stored in the data storage 110 and analyzed by the controller 102 in determining the user's preference. A person monitoring the testing could also monitor this spoken information for use during that test or to assist in research for future testing of that user 114 or other users. The controller 102 can also control the audio device 112 to emit sounds corresponding to the displayed pair of images.

The controller 102 in Step S3 receives and analyzes data pertaining to these respective eye movements pertaining to each of the images A and B, and stores this data in, for example, data storage 110 or at any other suitable location. For example, the controller 102 can analyze the eye tracking data to ascertain mental perceptions of the user 114, such as those indicating whether the user 114 is paying attention, whether the user 114 is confused, what the user 114 may be thinking about the images (e.g., a level of interest), whether the user 114 looked in the direction of the image but did not actually see the image, whether the user 114 looked in the direction of the image and was not interested in the image, and so on. Upon ascertaining a level of confusion, viewing difficulty or interest by the user 114, the controller 102 can control the display 104 to display different pairs of images that the user 114 may find less confusing. In some instances, the controller 102 can determine the level of confusion, viewing difficulty or interest by comparing the user's eye tracking data in the current test to a library of eye tracking data from previous tests. For example, if the user's eye tracking data in the current test correlates closely to eye tracking data from a previous test where the user in the previous test was not confused, the controller 102 can conclude that the user in the current test is not confused. The controller 102 can also estimate the age of the user 114 based on this eye tracking data, such as speed of eye movement, time of fixation and so on. In addition, the controller 102 can request that the user 114 speak into the microphone of the user interface 106, and perform a voice analysis on the user's speech to estimate the user's age. The information gathered can also incorporate facial characteristics to determine emotional states, use of eyewear, gender, and driver identification for additional analyses.

Furthermore, any of the eye tracking devices 108 through 108-1 including a scene camera, or any other type of camera monitoring device, can provide feedback data to the controller 102 indicating hand positioning and movement of the hand of the user 114 during the selection process. The controller 102 could thus store this feedback data indicating the interaction by the user 114 with individual display screens. Also, the controller 102 can determine based on the eye tracking data whether the user is in a driver seat position or a passenger seat position, and can also determine whether the driver and passenger seats are occupied. In addition, the controller 102 can receive or determine cultural information, market information and general user preferences. Cultural information can describe how users in or from a specific culture reads left to right or top to bottom. Market information can be whether a user lives in or is from a right hand drive or left hand drive country. And, general user preferences can indicate that displays in a landscape orientation are typically read left to right and displays in a portrait orientation are typically read top to bottom. Furthermore, prior to performing the eye tracking analysis, the controller 102 can also use this information to, for example, provide recommendations or tips to the user 114 for future images being displayed.

The controller 102 also receives from the user interface 106 the selection of one of the two displayed images made by the user 114 in Step S4. For example, if the user prefers image A, the user 114 can, for example, click on image A using the user interface 106, to identify image A as the selected image. The controller 102 will thus generate selection data indicating that for the comparison of images A and B, the user 114 selected image A. The controller 102 can store that selection data, along with the eye tracking data pertaining to each of the images, in the data storage 108, or at any other suitable storage location. The controller 102 determines in Step S5 if all of the possible pairs of images for comparison have been displayed. If there are pairs of images remaining to be displayed, the processing then repeats to Steps S1 and S2 for the next pair of images until all of the pairs of images have been displayed, and one of the images from each pair of images has been selected by the user 114.

Accordingly, the controller 102 in this testing example can control the display 104 to display the images for comparison and selection by the user 114 in the following manner: A-B, A-C, A-D, B-C, B-D, C-D. The number of pairs to be displayed by the display 104 and evaluated can be determined by the following equation:

$$n(n-1)/2$$

where n=the number of items to compare.

Accordingly, when there are four images A, B, C and D, the number of pairs for comparison equals $4(4-1)/2=6$ pairs.

For ten images A through J, the number of pairs for comparison equals 10(10−1)/2=45 pairs. Naturally, the controller 102 can control the display to display the pairs of images in any suitable order. The controller 102 can then generate a database pertaining to the testing, and can store that database in the data storage 110 or at any other suitable location (e.g., the storage could also be stored in an external data storage device (not shown) and transmitted to the test equipment or vehicle). An example of such a database is shown in Table 1 below:

TABLE 1

| Displayed Pair | User Selection | Eye Tracking Data |
| --- | --- | --- |
| A-B | A | A-B Eye Movement Data |
| A-C | A | A-C Eye Movement Data |
| A-D | A | A-D Eye Movement Data |
| B-C | B | B-C Eye Movement Data |
| B-D | B | B-D Eye Movement Data |
| C-D | C | C-D Eye Movement Data |

Figure 8:
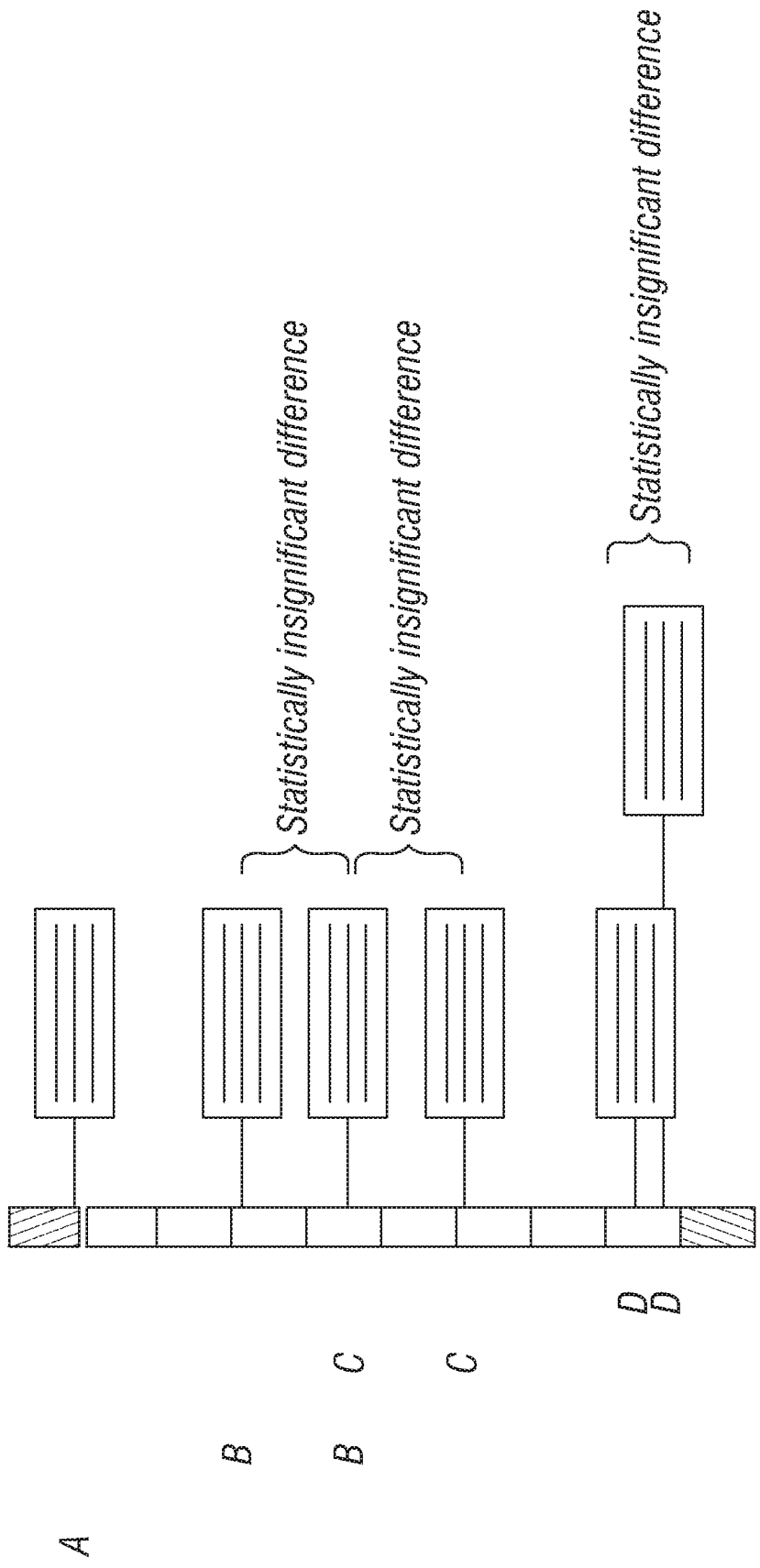
FIG. 8 is a conceptual diagram illustrating a ranking of the different configurations of display screens based on the preference of a user after the testing operations according to the flowchart in FIG. 5 have been performed.

As discussed above, the controller 102 analyzes the eye movement data received from the eye tracking device 108 representing eye movement of the user 114 while the user 114 is viewing each of the pairs of images being displayed on the display 104. Once the controller 102 determines in Step S5 that all of the pairs of images have been displayed for comparison and selection by the user 114, the processing proceeds to Step S6. Based on the selection by the user 114, as well as the eye movement data, the controller 102 in Step S6 can designate a vehicle display image that can be displayed as the preferred display configuration on the display 40 of the vehicle 10. For example, as shown conceptually in FIG. 8, the controller 102 determines that image A is the image most preferred by the user 114. Thus, the controller 102 can designate image A as the vehicle display image. In this example, the controller 102 determines that images B and C have a statistically insignificant difference as to their preference by the user 114, and the controller 102 determines that image D is the image least preferred by the user 114. While the chart in FIG. 8 shows how the different displays are ranked based on the paired comparison test alone, additional columns can be added to this chart showing the results of the eye tracking test. For example, the second column could show fixation time and a third column could show number of fixations. This chart shows how the paired comparison data can be combined with the eye-tracking data to determine if the screens A-D can be further optimized and optimized screens can be created. Any optimized screens created by controller 102 in the first test can then be compared with the preferred screens from the first test in a follow-up test prior to final designation of the vehicle image(s). Alternatively, the controller 102 can designate two preferred images for display on the display 40, with the controller 102 designating one of the preferred images based on selection by the user 114 and the other of the preferred images based on the eye tracking data representing the eye movement of the user 114 when viewing the image pairs as discussed above. In a further alternative embodiment, Step S5 can be followed by Step S5.5 (not shown) where the controller 102 can select an optimal image based on the first test, identify new images E-G that represent a refined version of the selected optimal display from the first test and conduct a second test (returning to S1 and S2) with the selected optimal display and refined images E-G. Thus, the comparison/eye tracking test can be iterative and allows the user to narrow in on the best image. Finally, the apparatus and procedure can be incorporated and administered in a production vehicle with the results of the test replayed/presented on the vehicle system itself or transmitted externally for analysis and user feedback.

The preferred display configuration of the vehicle display image to be displayed on the display 40 can thus provide a clear operational model with simple logic and flow, and expected features and functions. The preferred display configuration allows for good system performance with high findability for the information being displayed, along with good ordering based on, for example, task sequence and frequency-of-use. Grouping can be arranged at the desired locations at the top, bottom, left, right and middle of the display 40 based on the preferred configuration, operation clearances, desired white space, and also based on color, size, orientation, spatial features, height, width, font size, readability and understandability of the icons and information, and useful and meaningful content and design for the icons.

As can be appreciated from the above, the testing shown in the flowchart of FIG. 5 can be performed for a number of users 114. The preference information obtained for each of the users 114 can then be analyzed to determine an overall user preference which can be used, for example, as a preferred manner in which the display 40 can display information pertaining to, for example, the vehicle entertainment system equipment 18, communication equipment 20, navigation equipment 22, GPS equipment 24, user inputs 28 and so on. In addition, although the question presented in FIG. 3 is shown as "Which do you think is 'Easier to use while driving?'", several different questions can be presented. Other questions include: "Which do you think is 'most attractive?'" and "Please find item X on the display (item X could be the search field)". Each different question can be used to change the scope of the test. The "Easier to use while driving" question might be most useful when a driver is trying to choose the best display. The other two questions might be most useful when the test is conducted outside of the vehicle and other aspects of the displays are being investigated. When the question is "Please find the search field", the search field becomes an area of interest. The areas of interest for each image/display can be determined before experimentation. The sequence of moving between areas of interest may also be predetermined (e.g., there are 2 elements to searched for and confirmed on the screen, followed by selecting an OK button). For eye movements, the amount of scanning, as well as the scan paths taken will be analyzed to assess usability characteristics. These gaze plots generally combine fixation duration data by the size of each fixation dot. The number of fixations, fixation duration, scan path of fixations for each image or each area of interest are identified. The performance of these areas of interest can be analyzed to build a database of characteristics of good and bad designsOther areas of interest can include areas of prime usability (best visibility areas, easiest to reach ares). In addition, crowd sourcing can be used across the vehicles through analysis and uploading of data to Nissan for analysis. Last, the information gathered can also incorporate facial characteristics to determine emotional states, use of eyewear, gender, and driver identification for additional analyses.

The vehicle display configuration system 12 can also be used to set preferred sound characteristics used in the vehicle 10. For example, the controller 102 can also control the audio device 112 to emit different pairs of sounds within a predetermined window of time (e.g., sound A followed by sound B), with an instruction to the user after each pair to select a preferred one of the sounds. The sounds can be, for example, the same tone at different decibel levels, or different sounds at the same decibel levels, or a combination of both. The controller 102 can perform this paired comparison for all of the different sounds according to the equation n(n−1)/2 set forth above, until the user 114 has selected a sound from each pair. The controller 102 can then generate information indicating the preferred sound characteristics that can be used by the vehicle 10. For instance, the controller 16 on the vehicle 10 can control the speakers 42 to emit audio warnings, alerts, messages and so on at the preferred decibel level and at the preferred tone. This testing can also be used to adjust the 3-dimensional localization of the sound within the vehicle 10. For instance, the testing can be used to determine which virtual location in the passenger compartment 14 would best describe a hazard approaching the vehicle 10 from the rear, front, left, right, above and below. This testing could also be used to determine how best to present a caller's voice within the passenger compartment 14, such as at the center of the passenger compartment 14, the driver's door, the driver's a-pillar, the front, in the headrest of the driver's seat, and so on. As with the display testing discussed above, this audio testing can be performed for a number of users 114. The preference information obtained for each of the users 114 can then be analyzed to determine an overall user preference which can be used, for example, as a preferred manner in which the controller 16 on the vehicle 10 can control the speakers 42 to emit audio warnings, alerts, messages and so on at the preferred decibel level and at the preferred tone.

Figure 9:
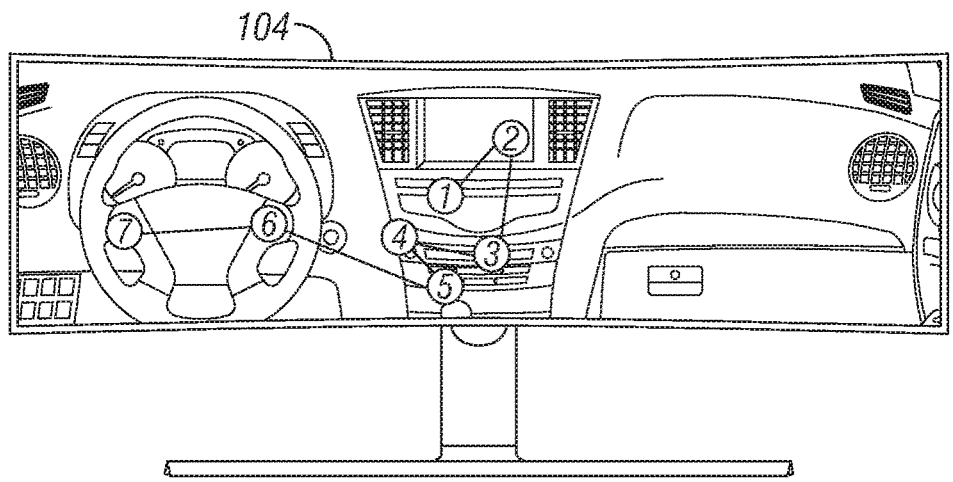
FIGS. 9 through 11 are conceptual diagrams illustrating an example of eye movement of a user tracked by the vehicle display configuration system with respect to an image of an instrument panel of a vehicle.
Figure 10:
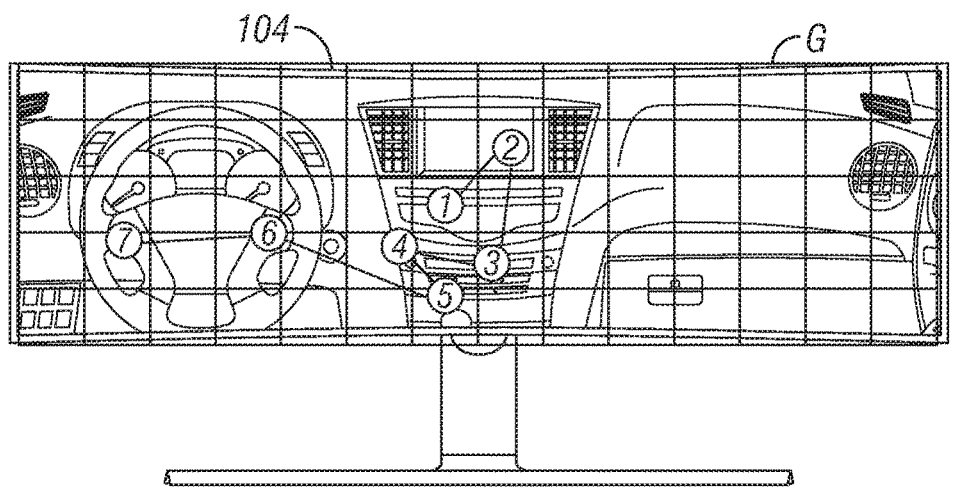
Figure 11:
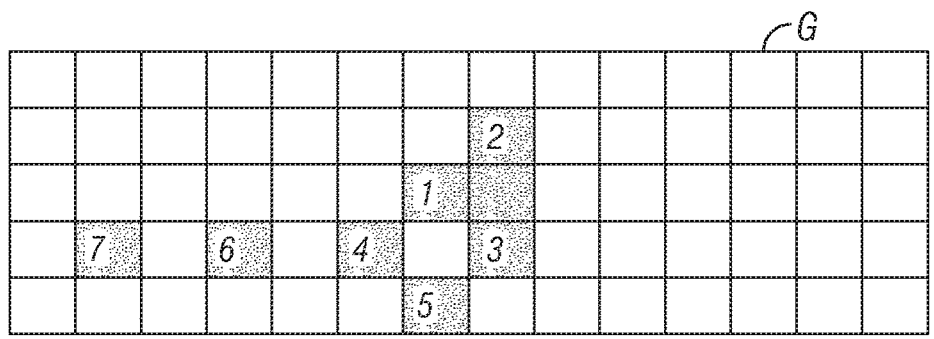
Figure 12:
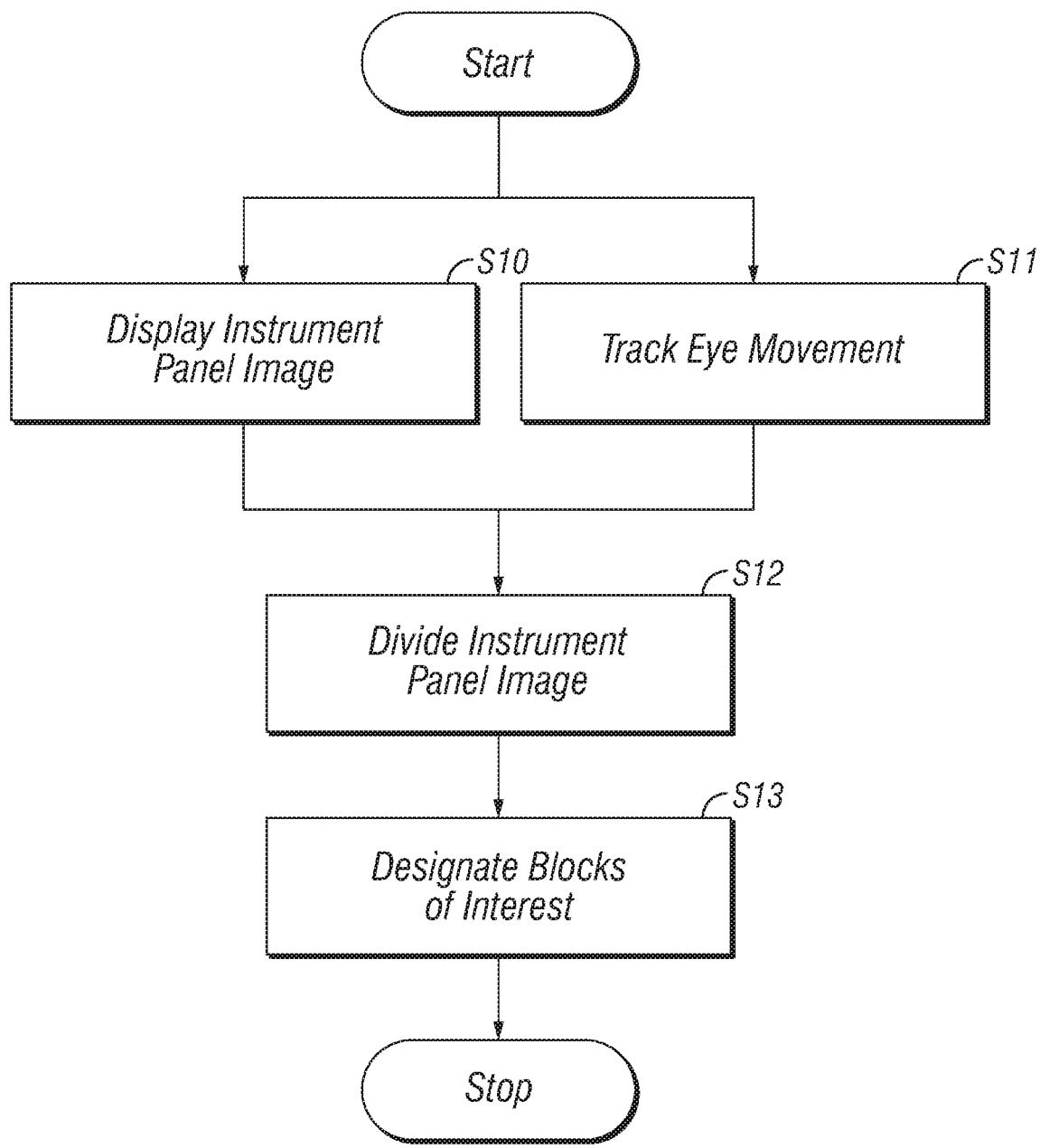
FIG. 12 is a flowchart illustrating an example of operations performed by the vehicle display configuration system during the eye movement tracking shown in FIGS. 8 through 10.

The vehicle display configuration system 12 can also be used to configure the entire instrument panel 44 of the vehicle 10. For example, as shown in FIGS. 9 through 10 with reference to the flowchart in FIG. 12, the controller 102 in Step S10 can control the display 104 to display an image IP representing the instrument panel 44 of the vehicle 10. The controller 102 in Step S11 can control the eye tracking device 108 to track the eye movement of the user 114 while the display 104 is displaying the image IP. The controller 102 can designate the points at which the user's eyes gaze at a particular position on the image IP as sequential points 1 through 7. The controller 102 in Step S12 can divide the image IP into a grid G, with the points 1 through 7 being present in respective blocks in the grid G. In Step S13, the controller 102 can designate the blocks having points 1 through 7 present as blocks of interest on the grid G. The grid G is not typically shown to the user during the test. The controller uses the grid to position the components (buttons, lists, icons, areas of interest, etc.) of the various displays before the test and to present the eye tracking data at the end of the test. The grid size can be large or small. A large grid is used to show a high density of information on the display. For example, the LCD display in an IP image might require a denser grid for analysis where open areas of the IP with few elements requires less dense grids. The grid decided or determined could be used to help layout an optimized layout for that customer, by searching a database of like images with similar grid sizes. For example, based on various types of images tested, including IP images, the optimal grid pattern would be determined. Then, after the first test, a second test be conducted where controller 102 can present only displays with the optimal grid pattern The above operations could be repeated with the images of the components of instrument panel rearranged in the image IP. For instance, the images of the climate control system, the radio, the navigation information and so on can be rearranged on the image IP, and the eye tracking device 108 can track eye movement of the user observing this image IP having the rearranged information.

These operations discussed above can also be performed by controller 16 in the vehicle 10 while the user is present in the passenger compartment 14 of the vehicle 10. In this case, the controller 16 can control the eye tracking device 46 to track the eye movement of the user, such as the driver, in relation to the actual instrument panel 44 of the vehicle 10. The controller 16 can then mathematically divide the instrument panel 44 into a grid G, with the points 1 through 7 being present in respective blocks in the grid G. The controller 16 can designate the blocks having points 1 through 7 present as blocks of interest on the grid G.

Either of the above testing situations described with regard to FIGS. 9-12 can be performed for a sample of users to determine a general preference among users. The testing results could thus be used to reposition, for example, the display 40, the radio, the climate control system, the display of the navigation information, and so on, on the instrument panel 44. This can therefore assist with design of the interior of the vehicle 10.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," or "element" when used in the singular can have the dual meaning of a single part or a plurality of parts. Accordingly, these terms, as utilized to describe the present invention should be interpreted relative to an autonomous vehicle communication system.

The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle display configuration system comprising:
a display;
an eye tracker configured to track eye movement of a user viewing the display; and
an electronic controller configured to control the display to sequentially display a side-by-side comparison of sets of a plurality of images for comparison and selection by the user, to receive selection information representing a respective selected image from each of the sets being displayed on the display as selected by the user, to analyze eye tracker eye movement information received from the eye tracker representing eye movement of the user while the user is viewing each of the sets being displayed on the display to determine a preferred image, and to designate a vehicle display image as the preferred image from the sets of the plurality of images based on the selection information and a result of the analysis of the eye movement information.

2. The vehicle display configuration system according to claim 1, wherein
each of the sets includes a respective pair of the images; and
the selection information represents each respective one of the pairs of images selected by the user.

3. The vehicle display configuration system according to claim 1, wherein
each of the images represents a respective display of control buttons and displayed content for a vehicle instrument panel display, with the control buttons and displayed content being at different locations within each respective display.

4. The vehicle display configuration system according to claim 3, wherein
the display is configured as the vehicle instrument panel display; and
the electronic controller designates the vehicle display image by displaying the vehicle display image on the vehicle instrument panel display.

5. The vehicle display configuration system according to claim 1, wherein
the electronic controller is configured to analyze the eye tracker information for each of the sets of images by comparing eye movement characteristics of the user associated with the images in each of the respective sets of images, and to identify in each of the respective sets of images the image for which the eye movement characteristics indicate a lesser degree of eye movement and a greater degree of eye fixation than for any other image in that respective set of images.

6. The vehicle display configuration system according to claim 1, wherein
the display, the eye tracker and the electronic controller are on-board a vehicle; and
the electronic controller is configured to control the display to sequentially display the sets of images, to receive the selection information, to analyze the eye tracker eye movement information, and to designate the vehicle display image, while the user is within a passenger compartment of the vehicle.

7. The vehicle display configuration system according to claim 1, wherein
the display, the eye tracker and the electronic controller are external to a vehicle; and
the electronic controller is configured to control the display to sequentially display the sets of images, to receive the selection information, to analyze the eye tracker eye movement information, and to designate the vehicle display image, while the user is external to the vehicle.

8. The vehicle display configuration system according to claim 1, wherein
the electronic controller is further configured to control the display to display feedback information to the user based on the result of the analysis of the eye movement information.

9. The vehicle display configuration system according to claim 1, wherein
the electronic controller is further configured to determine an age of the user and to analyze the eye tracker eye movement information based on the age of the user.

10. The vehicle display configuration system according to claim 8, wherein
the electronic controller is configured to analyze audio information received by the electronic controller based on a speech pattern spoken by the user.

11. The vehicle display configuration system according to claim 1, further comprising
a speaker; and
wherein the electronic controller is further configured to control the speaker to sequentially output sets of a plurality of sound characteristics for selection by the user via a user input, and to determine a designated sound characteristic based on the sound characteristics of each of the sets as selected by the user.

12. The vehicle display configuration system according to claim 1, wherein
the electronic controller is configured analyze the eye tracker eye movement information received from the eye tracker representing eye movement of the user while the user is viewing each of the sets being displayed on the display to determine a level of confusion of the user, and is configured to modify content of the images in the sets being sequentially displayed based on the level of confusion of the user.

13. A vehicle display configuration method comprising:
controlling, by an electronic controller, a display to sequentially display a side-by-side comparison of sets of a plurality of images for comparison and selection by a user;
controlling, by the electronic controller, an eye tracker to track eye movement of the user and output eye tracker eye movement information representing eye movement of the user while the user is viewing each of the sets being displayed on the display;
analyzing, by the electronic controller, the eye tracker eye movement information; and
designating, by the electronic controller, a preferred vehicle display image from the sets of the plurality of images based on a result of the analysis of the eye movement information and selection information representing a respective preferred image from each of the sets being displayed on the display as selected by the user.

14. The vehicle display configuration method according to claim 13, wherein
the designating includes designating, by the electronic controller, the vehicle display image by controlling a vehicle control panel display on-board a vehicle to display the vehicle display image.

15. The vehicle display configuration method according to claim 13, wherein the analyzing includes comparing eye movement characteristics of the user associated with the images in each of the respective sets of images, and identifying in each of the respective sets of images the image for which the eye movement characteristics indicate a lesser degree of eye movement and a greater degree of eye fixation than for any other image in that respective set of images.

16. The vehicle display configuration method according to claim 13, further comprising controlling the display, by the electronic controller, to display feedback information to the user based on the result of the analysis of the eye movement information.

17. The vehicle display configuration method according to claim 13, further comprising determining, by the electronic controller, an age of the user by analyzing a speech pattern spoken by the user, user age input, user recognition; and wherein the analyzing of the eye tracker eye movement information further includes analyzing the eye tracker movement information based on the age of the user.

18. The vehicle display configuration method according to claim 13, further comprising controlling, by the electronic controller, a speaker to sequentially output sets of a plurality of sound characteristics for selection by the user via a user input; and determining, by the electronic controller, a designated sound characteristic based on the sound characteristics of each of the sets as selected by the user.

19. The vehicle display configuration method according to claim 13, further comprising controlling the display, by the electronic controller, to display an indicator representing a current focal position of at least one eye of the user.

* * * * *